United States Patent [19]
Takeda et al.

[11] Patent Number: 5,345,513
[45] Date of Patent: Sep. 6, 1994

[54] METHOD AND APPARATUS FOR PROCESSING IMAGE CORRESPONDING TO RADIOGRAPHIC PATTERN

[75] Inventors: Siro Takeda; Fumihiro Namiki; Takahiro Haraki; Hideyuki Hirano; Kenji Ishiwata, all of Kawasaki; Shigehiko Katsuragawa, Tonami, all of Japan; Katsumi Abe, Clarendon Hills, Ill.

[73] Assignee: Fujitsu Limited, Kawasaki, Japan

[21] Appl. No.: 856,993

[22] Filed: Mar. 24, 1992

[30] Foreign Application Priority Data

Mar. 30, 1991 [JP] Japan .................................. 3-093152

[51] Int. Cl.$^5$ .............................................. G06K 9/00
[52] U.S. Cl. .................... 382/6; 364/413.13; 382/18; 382/51
[58] Field of Search ............................. 382/18, 51, 6; 364/413.13, 413.14

[56] References Cited

U.S. PATENT DOCUMENTS

| | | | |
|---|---|---|---|
| 3,859,527 | 1/1975 | Luckey | 250/327 |
| 4,310,886 | 1/1982 | Kato et al. | 364/414 |
| 4,887,305 | 12/1989 | Shimura | 382/81 |
| 4,950,894 | 8/1990 | Hara et al. | 382/18 |
| 4,955,067 | 9/1990 | Shimura | 382/62 |

FOREIGN PATENT DOCUMENTS 61-35069 2/1986 Japan ............................ H04N 1/387

OTHER PUBLICATIONS

Patent Abstracts of Japan, Unexamined Applications, P Field, vol. 11, No. 62, Feb. 25, 1987, The Patent Office Japanese Government, p. 60, P 551 No. 61-225 640 (Toshiba).

*Primary Examiner*—Leo H. Boudreau
*Attorney, Agent, or Firm*—Staas & Halsey

[57] ABSTRACT

The present invention relates to a method for processing an image corresponding to a radiographic pattern, the image being formed of a plurality of pixels each having a value corresponding to density. The method includes the steps of obtaining an image corresponding to a radiographic pattern so that values of pixels forming the image are stored in a memory; dividing the image into a plurality of image regions based on the values of the pixels forming the image, each image region including pixels each of which has a value falling within a predetermined range; and applying an image processing to the plurality of image regions of the image, processing conditions used for the plurality of image regions in the image processing differing from each other.

23 Claims, 13 Drawing Sheets

METHOD AND APPARATUS FOR PROCESSING IMAGE CORRESPONDING TO RADIOGRAPHIC PATTERN

BACKGROUND OF THE INVENTION (1) Field of the Invention

The present invention generally relates to a method and an apparatus for processing an image corresponding to a radiographic pattern, and more particularly to a method and an apparatus for processing an image corresponding to a radiographic pattern, which can be applied to an image processing on an X-ray photograph obtained by a digital X-ray medical equipment.

(2) Description of Related Art

Medical photographs such as X-ray photographs are used for diagnosing diseases. The X-ray photographs are obtained in accordance with the following procedure. The X-ray applied to a subject is projected onto a fluorescent material (a fluorescent screen) after passing through the a subject, so that the fluorescent material radiates a visible light. The visible light from the fluorescent material is projected onto a silver film. Then the silver film is developed, and the X-ray photograph is obtained. The above procedure is often referred to as a screen/film method (herein after referred to as S/F method).

When the number of the X-ray photographs increases, large space is needed to keep X-ray photographs. In addition, it is difficult to find an X-ray photograph from among a large number of X-ray photographs. Thus, the following method has been proposed: images on X-ray photographs are converted to digital image information by a film reader, and the digital image information is recorded in an optical disk. When digital image information is stored in an optical disk, even if an X-ray photograph is obtained under unsuitable conditions, a suitable image can be obtained by carrying out an image processing with respect to the digital image information.

Conventionally, in an X-ray imaging system having high sensitivity and a high resolution, a photostimulable phosphor (an acceleratable phosphor) has been used. A detailed discussion of a radiation imaging system using the photostimulable phosphor is given in U.S. Pat. No. 3,859,527. The photostimulable phosphor used in the system disclosed in this patent has a characteristic in which part of the energy supplied thereto through an irradiation, such as that of X-rays, is stored in the photostimulable phosphor. This state, where energy is stored in the photostimulable phosphor, is stable, so that the state is maintained for some time. When a first light, such as an acceleration light, is projected onto the photostimulable phosphor having the above state, a second light is radiated thereby, corresponding to the energy stored in the photostimulable phosphor. The second light is often referred to as an accelerated phosphorescence. The first light is not limited to a visible light, and can have a frequency falling within a wide range between an infra-red and an ultra-violet. The second light also can have a frequency falling within a wide range between infra-red and ultra-violet. The frequency of the second light depends on a material of the photostimulable phosphor. The second light (an electromagnetic wave) is converted into an electrical signal by a photoelectric conversion device. Then, digital image information is obtained based on the converted electrical signal.

FIGS. 1 and 2 respectively show a flow chart and a film reader for obtaining a digital image from an X-ray film obtained in accordance with the S/F method described above.

Referring to FIG. 1, an X-ray film (an X-ray photograph) is obtained in accordance with the S/F method, in step 100. The X-ray film obtained in step 100 is supplied to a film reader, so that a digital image is generated thereby, in step 110. In the film reader shown in FIG. 2, the X-ray film supplied thereto is fed, by feed rollers 2, through a feed path 1 to a reading area $A_r$. While the X-ray film passes through the reading area $A_r$, a laser beam emitted from a laser scanning system 3 scans the X-ray film in accordance with a raster scanning method. The laser beam transmitted through the X-ray film is projected onto a photo detecting element array 5. The photo detecting element array 5 carries out photoelectric conversion so that digital image information corresponding to the converted electrical signal is obtained.

The digital image information is stored in a memory, in step 120. Then an image corresponding to the digital image information stored in the memory is displayed on a display unit, in step 130.

In a case where an image on the X-ray film is printed on a photographic paper, the photographic paper is supplied to the film reader 6. In this case, the laser beam reflected by the photographic paper is projected onto a photo detecting element array 4. Digital image information is obtained via the photo detection element array 4.

Examples of a system in which digital image information is obtained through use of the photostimulable phosphor are shown in FIGS. 3 and 4. A system shown in FIG. 3 has separate radiography and reading part parts; a system shown in FIG. 4 has them integrated.

Referring to FIG. 3, an photostimulable phosphor sheet (or plate) 15 is detachably mounted in a radiography stand 14. In a state where a subject 12 stands so as to face the photostimulable phosphor sheet 15, an X-ray 13 radiated by an X-ray generator 11 is supplied to the subject 12. Then the X-ray transmitted through the subject 12 is projected onto the acceleratable sheet 15, so that a latent image corresponding to a energy pattern stored in the photostimulable phosphor sheet 15 is formed on the photostimulable phosphor sheet 15. After the radiography is completed, the photostimulable phosphor sheet 15 is detached from the radiography stand 14 and supplied to a receiving part 17 of a reading unit 16. The photostimulable phosphor sheet 15 is fed from the receiving part 17 to a reading process block 19 via a feed path 18. In the reading process block 19, the first light scans the photostimulable phosphor sheet 15, and then image information is obtained based on accelerated phosphorescence (a second light) radiated, due to the scanning of the first light, from the photostimulable phosphor sheet 15. The image information obtained by the reading process block 19 is supplied to an image processing block 23 via a image transference path 22. The image processing block 23 carries out a predetermined image processing with respect to the image data supplied thereto. Then the image information output from the image processing block 23 is supplied to a display block 25, so that the image information is displayed on a CRT display unit or a printer outputs a hard copy of the image information, in the display block 25. After the process in the reading process block 19 is finished, the photostimulable phosphor sheet 15 is fed to an erasure block 20 via the feed path 18. In the erasure block 20, the first light is projected onto the photostimulable phosphor sheet 15 so that the energy stored therein is completely radiated. That is, the residual latent image is erased from the photostimulable phosphor sheet 15. After that, the photostimulable phosphor sheet 15 is fed to an ejection part 21. The photostimulable phosphor sheet 15 is then returned from the ejection part 21 of the reading unit 16 to the radiography stand 14.

The photostimulable phosphor sheet 15 may be provided in a magazine or a cassette.

In a system shown in FIG. 4, the photostimulable phosphor sheet 15 is set in a standing radiography unit 26. In a state where the subject 12 stands so as to face the photostimulable phosphor sheet 15 in the standing type radiography unit 26, the X-ray radiated by the X-ray generator 11 is supplied to the subject. After the latent image is formed on the photostimulable phosphor sheet 15 by supplying X-ray to the subject, the photostimulable phosphor sheet 15 is processed in the same manner as that in a case shown in FIG. 3.

The digital image information obtained by either the system using the film reader or the system using the photostimulable phosphor sheet (plate) is stored in a digital recording medium, such as an optical disk. Thus, a large space is not needed to store image information of the X-ray photographs. In addition, image information of an X-ray photograph out of a large number of X-ray photographs can be easily retrieved.

Conventionally, large number of image processing methods of digital images have been reported. In addition, an image processing of digital X-ray photograph also has been proposed.

A spatial frequency processing carried out in accordance with a formula (1) is well known, $$Q = S_{ij} + K \cdot (S_{ij} - S_m) \qquad (1)$$

where $S_{ij}$ is image data of a central pixel in an unsharp mask which is an n×n matrix as shown in FIG. 5, $S_m$ is an average of pixel data in the unsharp mask, K is an enhancement coefficient, and Q is image data obtained by the spatial frequency processing.

A spatial frequency processing in which the enhancement coefficient K is variable has been proposed. This type of spatial frequency processing is carried out in accordance with, for example, the following formula (2), $$Q = S + f(S - S_m) \cdot (S - S_m) \qquad (2)$$

where $f(S - S_m)$ is an enhancement coefficient which is a function of $(S - S_m)$. That is, the enhancement coefficient $f(S - S_m)$ has a value in accordance with image data of each pixel.

A spatial frequency processing referred to as a Wallis filter has been well known. The spatial frequency processing is carried out in accordance with the following formula (3) using a standard deviation value $\sigma$, $$Q = S + (A/\sigma + B)(S - S_m) \qquad (3)$$

where A and B are constants. In this type of spatial frequency processing, the enhancement coefficient is varied with respect to the standard deviation value $\sigma$.

In an X-ray photograph of a thorax, which photograph is obtained in accordance with the S/F method, there are shown white vascular tracts in a appropriately black lung region. A centrum, a diaphragm region and a heart region have a low density (close to white). The centrum appears slightly in the X-ray photograph, and information of regions other than the lung region is hardly to be obtained from the X-ray photograph. When the X-ray photograph of the thorax is taken so that contrast in regions other than the lung region is improved, the density of the lung region is increased. In this state, since the dynamic range of a density distinguished by the human eye is narrow, the vascular tracts in the lung region become indistinct.

In the X-ray photograph, regions other than the lung region are indistinct. However, there can be diseases in a thoracic vertebrae, heart, ribs, a lung behind a diaphragm. Thus, it is desired that a diagnosis of all anatomical regions can be performed based on one X-ray photograph.

Image processing can be applied to a digital X-ray photograph. Due to the image processing in which an image is enhanced, the thoracic vertebrae region, the heart region and the lung region can become slightly more distinct. On the other hand, as the vascular tracts in the lung region are enhanced in the same manner as the lung region, it becomes hard to see the lung region due to the enhanced vascular tracts. In this case, it is hard to diagnose diseases, such as incipient cancer, which are distinct in a digital X-ray photograph before applying the image processing.

Thus, a method in which two thorax images are formed on one film has been proposed. The first image corresponds to a normal X-ray photograph to which the image processing is not applied or is weakly applied. The second image is an image to which the image processing is strongly applied so that edges are enhanced. The lung region is diagnosed by using the first image. The centrum, the diaphragm, and the heart region are diagnosed by using the second image. According to this method, as the two images are formed on one film, a size or each image is less than that of the actual thorax. When each image is life size, the film having two images becomes exceedingly large. Thus, a cost of the film is increased.

A method has been proposed for obtaining an X-ray photograph in which a mediastinum region, and a heart-diaphragm region are distinct in the same condition as the lung region. In the S/F method, for example, compensation filters are used. In this case, an X-ray absorption layer having a first thickness is provided on the lung region, an X-ray absorption layer having a second thickness less than the first thickness is provided on the heart-diaphragm region, and an X-ray absorption layer having a third thickness less than the second thickness is provided on the mediastinum. This method is effective, so that not only the mediastinum but also other anatomical regions can be accurately diagnosed. This method is a type of gradation processing.

However, in the method using the compensation filters, the compensation filters, each having a size corresponding to each subject, must be provided to each subject. An operation for providing the compensation filters to each subject is troublesome.

Japanese Patent Laid Open Publication No. 61-35069 discloses the following image processing of a digital X-ray photograph which can obtain the same effects as the above compensation filters used in the S/F method.

A digital X-ray photograph obtained by using the photostimulable phosphor is displayed in a CRT. In a case of, for example, a thorax X-ray photograph, a border between the diaphragm having a low X-ray transmittance and a lung region having a high X-ray transmittance is recognized by visual observation on the CRT. Then, a predetermined value (signal) is added to image data of each pixel in a region having a low X-ray transmittance. In addition, the predetermined value is subtracted from image data of each pixel in a region having a high X-ray transmittance.

It is assumed that the size of the photostimulable phosphor sheet and the size of each subject are approximately constant. Thus, a standard pattern having regions each formed of pixels in which the density (image data) should be corrected has been previously stored in a computer. Then the predetermined value is added to a density of each of the pixels in accordance with the standard pattern.

However, the above image processing has the following disadvantages.

First, a border between adjacent anatomical regions must be recognized by visual observation on the CRT. Thus, it is hard to rapidly carry out the image processing.

Second, the size of the photostimulable phosphor sheet can be constant, but it is unwarranted to assume that the size of each subject is constant. That is, sizes between children and adults, men and women, fat people and slender people respectively differ from each other. In addition, it is difficult to set each subject at a constant position with respect to the photostimulable phosphor sheet. Thus, there is a case where each border between adjacent anatomical regions formed in each radiographic image differs from each border between adjacent anatomical regions in the standard pattern. In this case, a clear digital radiographic image can not be obtained.

SUMMARY OF THE INVENTION

Accordingly, a general object of the present invention is to provide a novel and useful method and apparatus for processing an image corresponding to a radiographic pattern in which the disadvantages of the aforementioned prior art are eliminated.

A more specific object of the present invention is to provide a method and apparatus for processing an image corresponding to a radiographic pattern in which all anatomical regions in an image corresponding to the radiographic pattern can become distinct.

The above objects of the present invention are achieved by a method for processing an image corresponding to a radiographic pattern, the image being formed of a plurality of pixels each having a value corresponding to density, the method comprising the steps of: (a) obtaining an image corresponding to a radiographic pattern so that values of pixels forming the image are stored in a memory; (b) dividing the image into a plurality of image regions based on the values of the pixels forming the image, each image region including pixels each of which has a value falling within a predetermined range; and (c) applying an image processing to the plurality of image regions of the image, processing conditions used for the plurality of image regions of the image processing differing from each other.

The above objects of the present invention are also achieved by an apparatus for processing an image corresponding to a radiographic pattern, the image being formed of a plurality of pixels each having a value corresponding to density, the apparatus comprising: reading means for reading an image corresponding to a radiographic pattern; memory means, coupled to the reading means, for storing values of pixels forming the image; dividing means, coupled to the memory means, for dividing the image stored in the memory means into a plurality of image regions based on the values of the pixels forming the image, each image region including pixels each of which has a value falling within a predetermined range; and processing means for applying an image process to the plurality of image regions of the image, processing conditions used for the plurality of image regions of the image processing differing from each other.

According to the present invention, as processing conditions used for the plurality of image regions, corresponding to anatomical regions in the image processing differ from each other, all image regions in the image corresponding to the radiographic pattern can become distinct.

Additional objects, features and advantages of the present invention will become apparent from the following detailed description when read in conjunction with the accompanying drawings.

DESCRIPTION OF THE PREFERRED EMBODIMENT

Spatial frequency processes of digital images which are carried out in accordance with the above formulas (1)–(3) have been proposed. A spatial frequency processing in which an enhancement coefficient is varied based on image data of each pixel has been also proposed. However what the relationship between image data of each pixel in an actual digital image and digital image data of each anatomical region is not clear. That is, each subject of the X-ray photograph has an independent constitution (a muscular type or a fat type). Thus, each border between adjacent anatomical regions on a X-ray photograph differ from that between adjacent anatomical regions on another X-ray photograph. It is necessary to obtain a relationship between image data of pixels and anatomical regions and a relationship between image data of each pixel and an X-ray transmittance. Further, it is necessary to obtain means for image data of pixels on a border between adjacent anatomical regions on an X-ray photograph.

A description will now be given of a method for determining what region, on a digital image, formed of a plurality of pixels each having a predetermined image data corresponds to a tissue.

Figure 1:
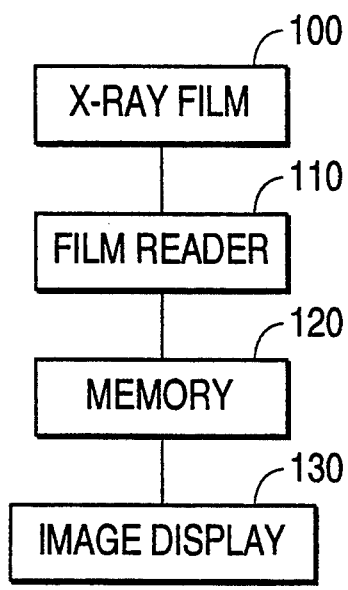
FIG. 1 is a flow chart illustrating a process for obtaining digital image by using a film reader.
Figure 2:
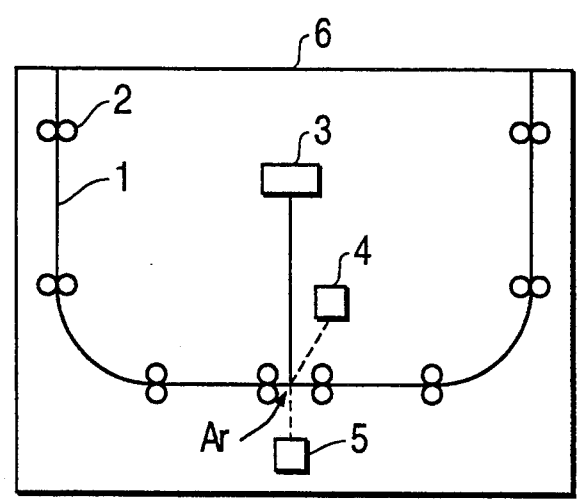
FIG. 2 is a diagram illustrating an example of the film reader.
Figure 3:
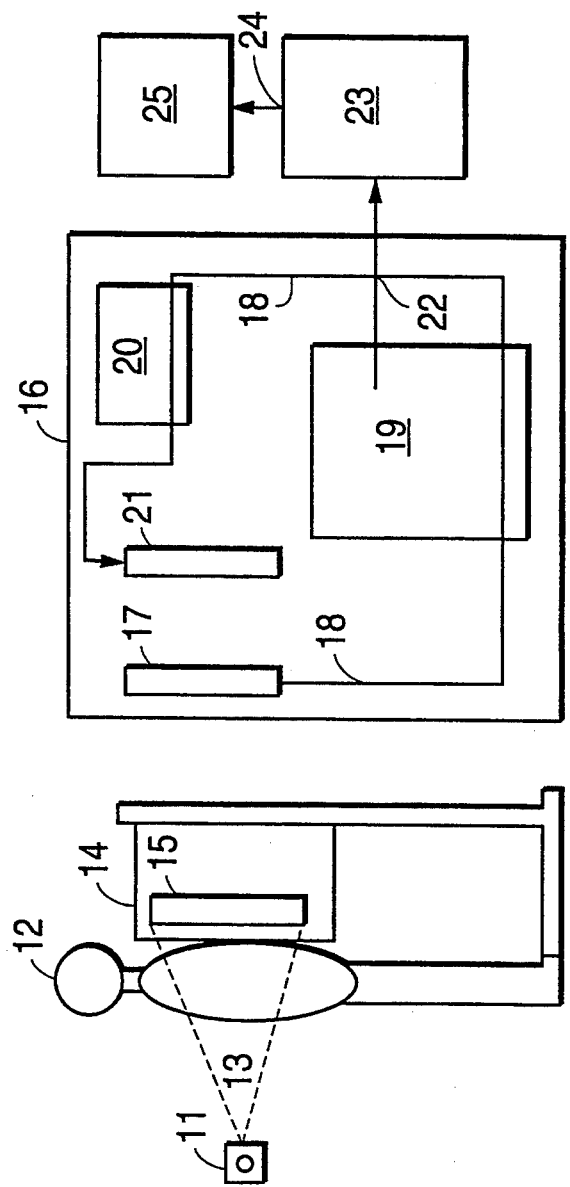
FIGS. 3 and 4 are diagram illustrating systems for obtaining digital X-ray photograph by using an photostimulable phosphor sheet.
Figure 4:
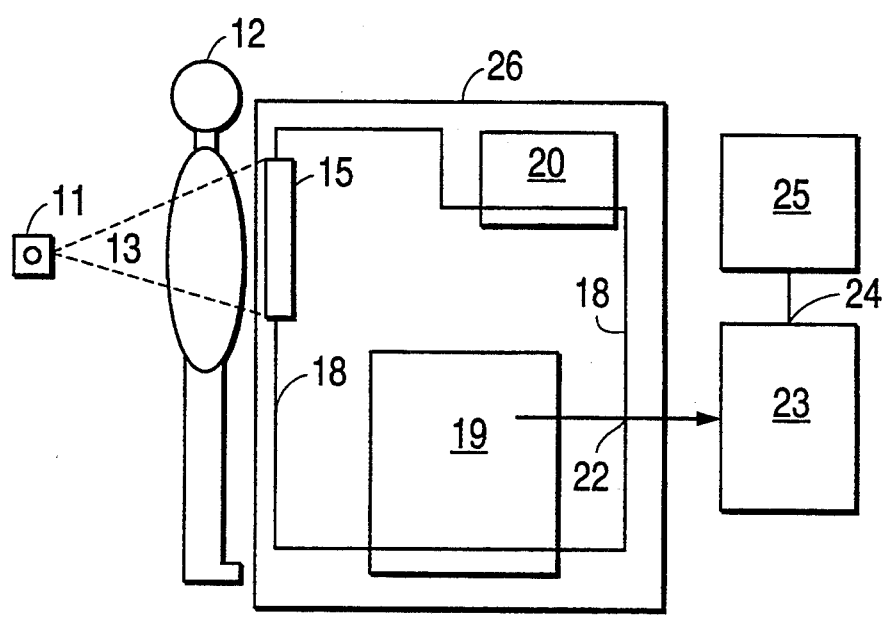
Figure 5:
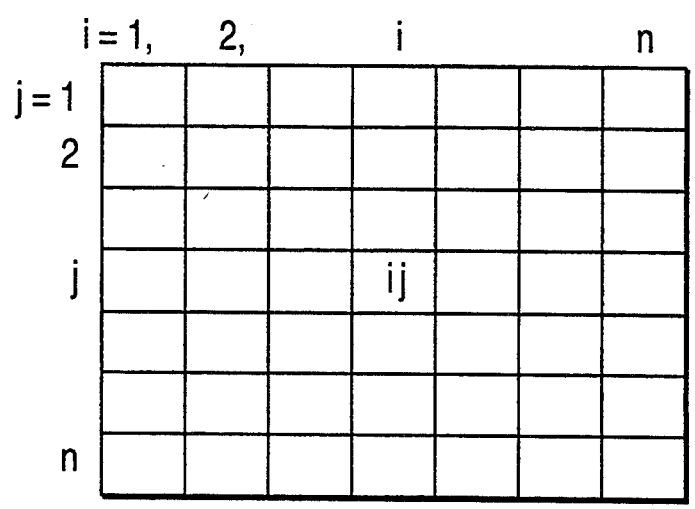
FIG. 5 is a diagram illustrating an example of an unsharp mask.
Figure 6:
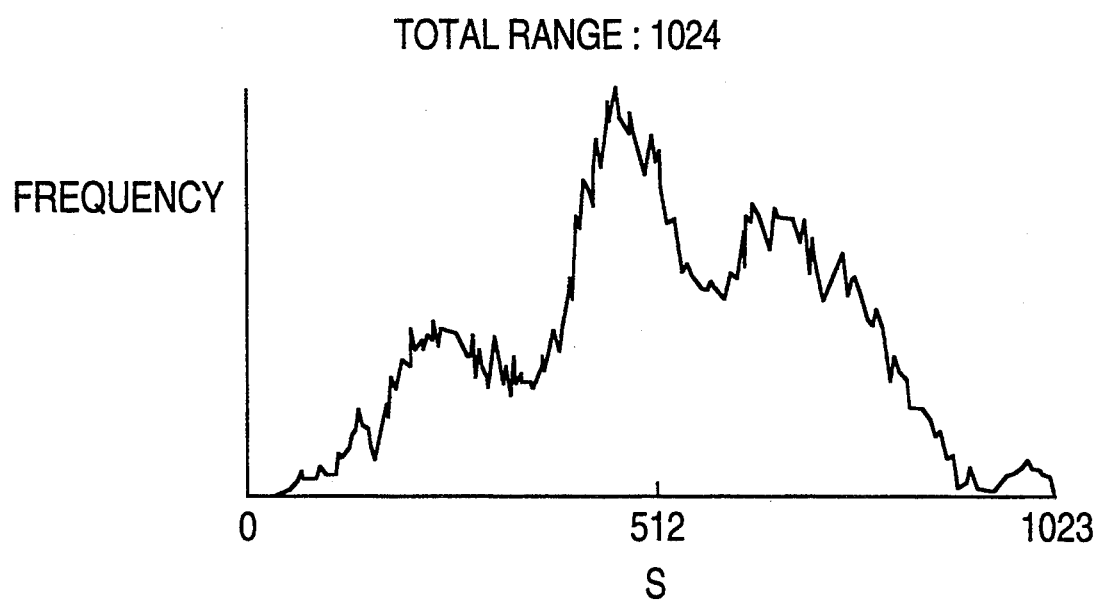
FIG. 6 is a graph illustrating an example of a histogram regarding a thorax X-ray photograph.

It is assumed that a digital image is obtained from a thorax X-ray photograph. The X-ray hardly transmits through the centrum and, and can easily transmit through the lung region. Transmittance of X-rays in the heart region is intermediate between those of the centrum and lung region. A transparent region corresponding to empty space has the largest X-ray transmittance. The image data of each pixel included in a region having a small X-ray transmittance is small. The image data of each pixel included in a region having a large X-ray transmittance is large. In this case, a histogram of image data in a thorax X-ray photograph is formed as shown in FIG. 6. Referring to FIG. 6, the image data has a value falling within a range of 0–1023 (1024 steps). There are four peaks and three valleys in the histogram shown in FIG. 6. The four peaks correspond respectively, from the left, to a first region including the centrum, a second region including the heart, a third region including the lung and a fourth region including the transparent region.

Thus, when each valley in the histogram is detected, a relationship between the image data of each pixel and each tissue (region) is found in the histogram. In general, each valley in a graph can be obtained based on a primary differentiation. However, as the histogram curve of the digital X-ray photograph shown in FIG. 6 has many small variations, a process for smoothing the histogram curve is required for detecting the valleys in the histogram. The process for smoothing the histogram curve is carried out in accordance with, for example, a moving average method.

In the moving average method, the following process is carried out.

An average of frequencies of image data having values in a range of 0–20 is defined to as "11". An average of frequencies of image data having values in a range of 1–21 is defined to as "12". Then, while a range of values is moved step by step, in steps of one, each average of frequencies of image data having values in the given range is determined. The range of values of image data used for obtaining each average is set so as to include a number of minute variations in the histogram curve falling within a range of 2–10. In a case where the number of minute variations included in the range of values of image data in the histogram is equal to or less than 2, the histogram curve can not be effectively smoothed. On the other hand, in a case where the number of minute variations included in the range of values of image data in the histogram curve can be smoothed, so that it is hard to detect valleys. The range of values of the image data (the width of the moving average) can be experimentally set. It is preferable that the range of values of image data used for obtaining the average in the moving average method be within a range of 1/200–1/20 of a total range of values of image data. The range of values of image data used for obtaining the average in the moving average method is referred to as a range of the moving average. The total range of values of image data corresponds to a width of the histogram shown in FIG. 6 (e.g. 1024). The range of a moving average depends on the total range of values of the image data. That is, in a case where the total range of values of image data (the width of the histogram curve) is equal to 1024, the range of the moving average may be wide. However, in a case where the total range of values of image data is equal to 256, the range of the moving average must be narrow. In this case, if the range of the moving average is wide, low frequency components in the histogram curve are eliminated.

Figure 7:
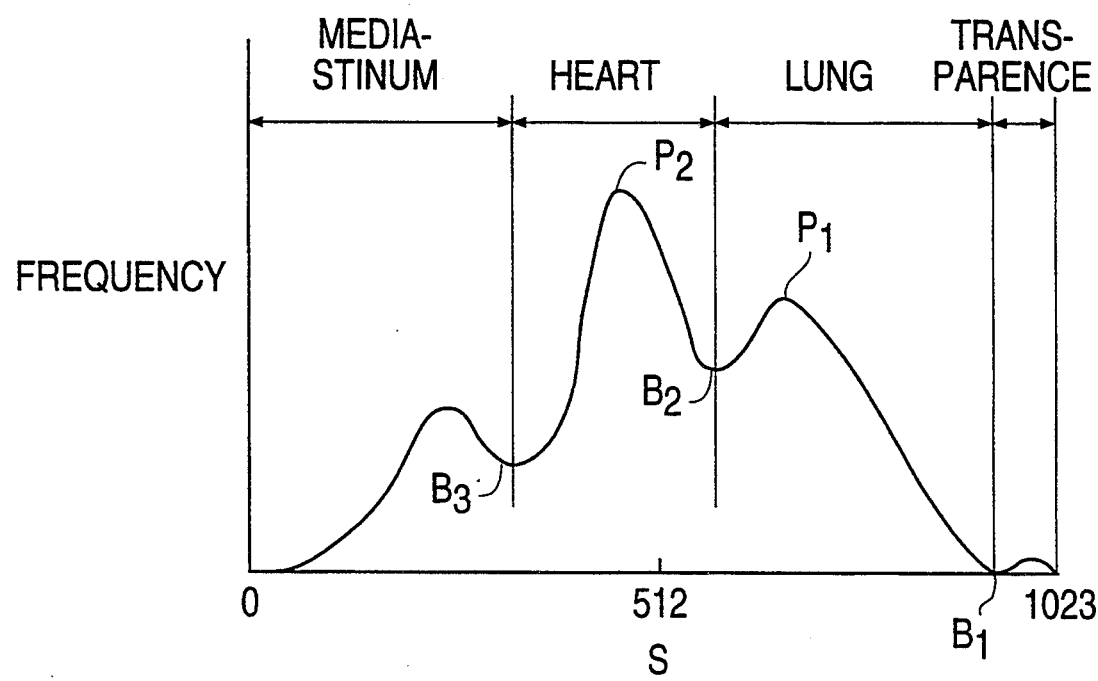
FIG. 7 is a graph illustrating an example of a histogram after a smoothing process.

Due to the above smoothing process, a histogram curve shown in FIG. 7 is obtained. Valleys each corresponding to a point at which a differential value is equal to zero is found on the histogram curve. In a case of the thorax X-ray photograph, the histogram curve has three valleys. When the number of valleys found in the histogram is greater than three, the smoothing process using a new range of the moving average is carried out again. The new range of the moving average is greater than the previous range. For example, when seven valleys are found in the histogram curve obtained by a smoothing process using a range "20" of the moving average, the smoothing process using a range "30" of the moving average is carried out again.

A description will now be given of an example of a process executed for borders between adjacent anatomical regions.

The histogram, corresponding to a thorax X-ray photograph, shown in FIG. 6 has four peaks and three valleys. While the smoothing process (the moving average) is carried out, the borders are found. The range of the moving average used in the smoothing process is moved from a starting value of image data toward a small value. The start value is set at a value falling within a region of 85–90% of the maximum value (e.g. 1024). When a difference between a minimum frequency and a maximum frequency in a range of the moving average is greater than a first reference, a value of image data corresponding to the minimum frequency is detected as a first border B1. The first reference is set to a value in a range of 1/10000–10/10000 of the total number of frequency included in the histogram. A pixel having a value greater than the first border is included in an image region corresponding to a transparent region, which is not an anatomical region or an anatomical region around the ribs. Further, the range of the moving average is moved toward a small value of image data. A maximum frequency is detected as a first peak P1 in the histogram under a condition in which there exists no valley greater than a second reference. The second reference is set at a value falling within a range of 1/10000–5/10000 of the total frequencies included in the histogram. Then, if a difference between a selected frequency and the first peak P1 is greater than the second reference, a value of image data corresponding to the selected frequency is detected as a second border B2. The second border normally corresponds to a border between the lung region and the heart-diaphragm region. After this, a second peak P2 is detected in the same manner as the first peak P1. Then, if a difference between a selected frequency and the second peak P2 is greater than a third reference, a value of image data corresponding to the selected frequency is detected as a third border B3. The third reference is set to a value falling within a range of 5/10000–10/10000 of the total frequencies included in the histogram. The third border B3 corresponds to a border between a part of the lung behind the heart and the centrum.

According to the above process, an image on the X-ray photograph is divided into four image regions corresponding to the anatomical regions. The first image region has pixels each having a value of image data less than the third border B3, the second image region has pixels each having a value of image data between the third border B3 and the second border B2, the third image region has pixels each having a value of image data between the second border B2 and the first border B1, and the fourth image region has pixels each having a value of image data greater than the first border B1. Normally, the first image region corresponds to the mediastinum, the second image region corresponds to the heart-diaphragm region, the third image region corresponds to the lung region and the fourth image region corresponds to the transparent region. The above correspondance was experimentally established. In a case where there is a disease such as a pneumonia in the lung, an image region corresponding to the disease may be easily distinguished from a region corresponding to a normal part of the lung.

A description will now be given of a spatial frequency processing.

A spatial frequency processing is applied to each anatomical region detected in the X-ray photograph in accordance with the above process. In an enhancement processing, a degree of enhancement with respect to image data of each pixel included in the lung region in the X-ray photograph is slightly minute or zero. On the other hand, a degree of enhancement with respect to image data each pixel included in the centrum, the diaphragm and the heart region in the X-ray photograph is large.

Figure 8:
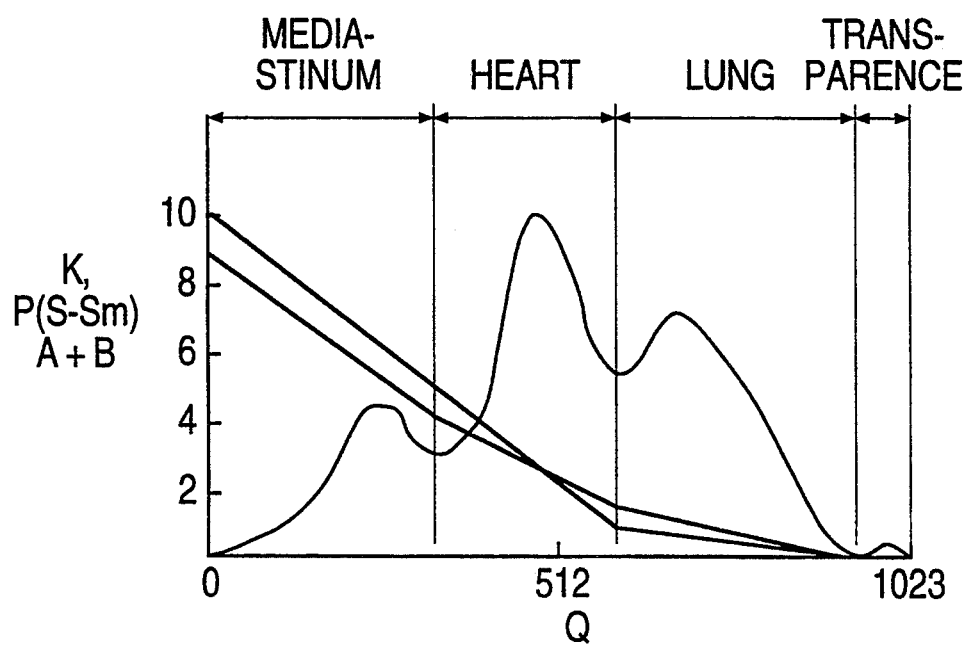
FIG. 8 is a graph illustrating an example of a variation of an enhancement coefficient.

In a case where the spatial frequency processing is carried out in accordance with the above formula (1), the enhancement coefficient K is set to a value falling within a range of 1.0–10.0 in the centrum. In the heart-diaphragm region, the enhancement coefficient K is set to a value falling within a range of 0.7–7.0. In the lung region, the enhancement coefficient K is set to a value falling within a range of 0–1.5. A relationship between the enhancement coefficient K and the values of the image data is represented by a monotone decreasing curve or a monotone increasing curve (inverse brightness), as shown in FIG. 8. The monotone decreasing or increasing curve can have a constant value with respect to the values of the image data.

In a case where the spatial frequency processing is carried out in accordance with the above formula (2), the enhancement coefficient K is varied based on a difference $\Delta S$ between a value S of a processing pixel located at the center of the unsharp mask and an average $S_m$ of values of pixels in the unsharp mask ($\Delta S = S - S_m$). In this case, the enhancement coefficient K is represented by $f(S - S_m)$. Values of the enhancement coefficient K can be obtained with reference to a look-up table made in accordance with a function $f(S - S_m)$. The function $f(\Delta S)$ is defined, for example, as follows.

In a first example, K is equal to zero (K=0) when $\Delta S$ is equal to zero ($\Delta S = 0$), and the function $f(\Delta S)$ is a monotone increasing function in which a value (K) of the function $f(\Delta S)$ monotonously increases when $\Delta S$ increases. This monotone increasing function may have a section which has a constant value with respect to values of $\Delta S$.

In a second example, when $\Delta S$ increases, a value (K) of the function $f(\Delta S)$ monotonously increases to the maximum, and after the value (K) reaches the maximum, the value (K) monotonously decreases.

In a third example, the function $f(\Delta S)$ is a monotone decreasing function in which a value (K) of the function $f(\Delta S)$ monotonously decreases when $\Delta S$ increases. The monotone decreasing function may have a section which has a constant value with respect to values of $\Delta S$.

Figure 9:
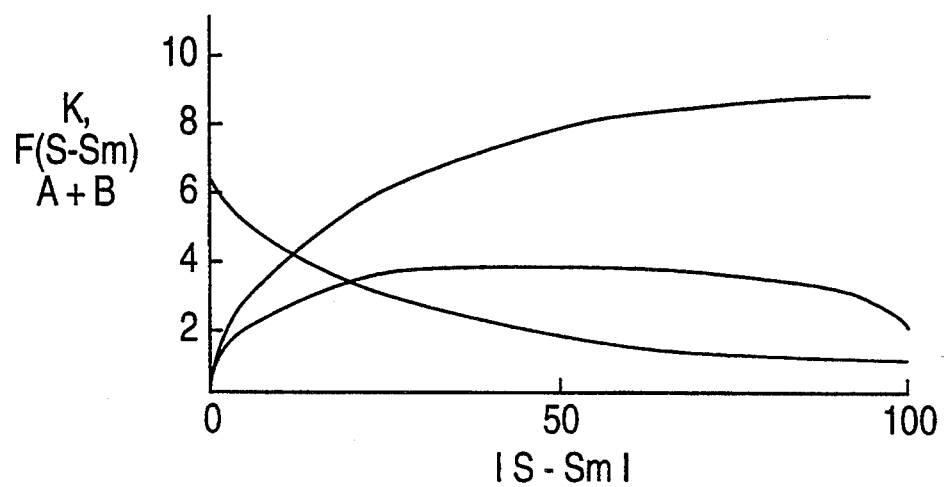
FIG. 9 is a graph illustrating an example of an enhancement coefficient varying in accordance with $(S-S_m)$.

The variations of the function $f(\Delta S)$ in the above examples are shown in FIG. 9.

In a case where the spatial frequency processing is carried out in accordance with the above formula (3), the enhancement coefficient K is varied based on a standard deviation $\sigma$ of a value of each of pixels in the unsharp mask. When the standard deviation $\sigma$ is large, the enhancement coefficient is set to a small value to prevent noises from being enhanced. When the standard deviation $\sigma$ is small, the enhancement coefficient is set to a large value. It is preferable that A+B have the same value, as is the case in the formula (1) when the standard deviation $\sigma$ is equal to 1 ($\sigma = 1$).

It is preferable that a size of the unsharp mask be varied based on a size of an image region corresponding to each anatomical region. That is, the unsharp mask having a large size is used in image regions corresponding to the a mediastinum, and the unsharp mask having a small size is used in an image region corresponding to the heart-diaphragm region and the lung region. For example, the size of the unsharp mask used in the image regions corresponding to the mediastinum is set to a value falling within a range of 4–8 mm, and the size of the unsharp mask used in the image regions corresponding to the heart-diaphragm region and the lung region is set to a value falling within a range of 3–5 mm.

A description will now be given of a first embodiment of the image processing with reference to FIG. 10.

Figure 10:
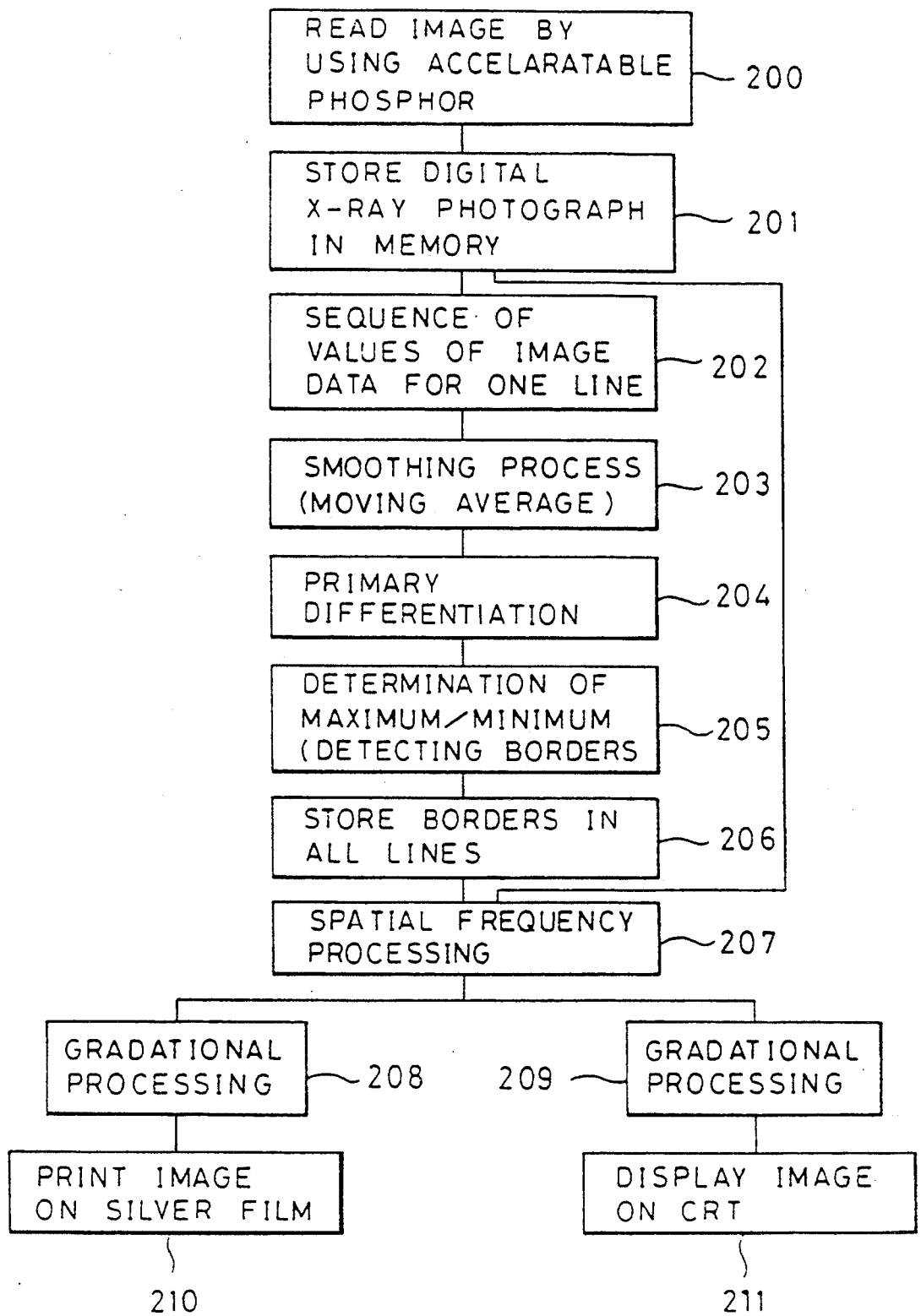
FIGS. 10 and 11 are flow charts illustrating examples of an image processing.

Referring to FIG. 10, an image of a thorax X-ray photograph stored in a photostimulable phosphor is read out, in step 200. The image read out from the photostimulable phosphor is stored, as digital image data, in a memory, in step 201. The image data is read out from the memory line by line, and a sequence of values of image data of pixels in one line is formed, in step 202. A smoothing process (the moving average method) is applied to the sequence of values of the image data for one line, in step 203. A primary differentiation processing is applied to the smoothed sequence of values of image data obtained by step 203, in step 204. Then maximum points and minimum points on the smoothed sequence of values of image data for one line are detected based on the result obtained by step 204, in step 205. A border pixel on each border between adjacent tissues (the anatomical regions) is determined by using the maximum points and the minimum points. The above steps 202–205 are repeatedly carried out, so that the border pixels in all lines of the image on the X-ray photograph are stored in a memory, in step 206.

An image region corresponding to each anatomical region is determined based on the border pixels in all lines of the image data stored in the memory.

After this, a spatial frequency processing is applied to the image stored in the memory, in step 207. The spatial frequency processing is carried out in accordance with either the formula (1), (2) or (3), and the enhancement coefficient used in the spatial frequency processing is varied in accordance with the image regions corresponding to the anatomical regions, as shown in FIG. 8 or FIG. 9.

A description will now be given of a second embodiment of the image processing with reference to FIG. 11.

Figure 11:
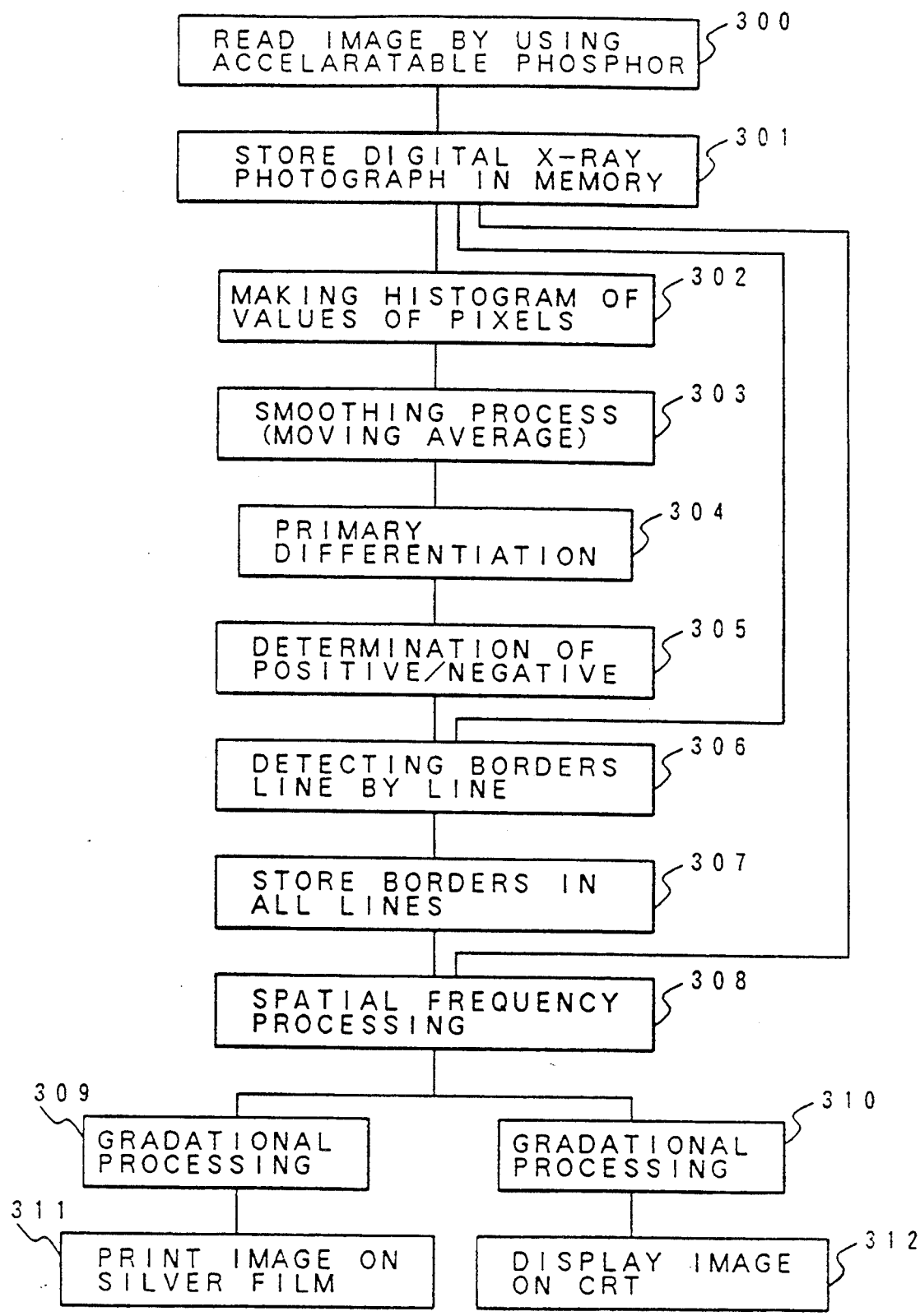

Referring to FIG. 11, an image of a thorax X-ray photograph stored in a photostimulable phosphor is read out, in step 300. The image read out from the photostimulable phosphor is stored, as digital image data, in a memory, in step 301. A histogram of values of image data stored in the memory is made, as shown in FIG. 6, in step 302. In step 303, a smoothing process (the moving average method) is applied to the histogram curve obtained by step 302. Then, in step 304, a primary differentiation processing is applied to the smoothed histogram curve obtained as shown in FIG. 7 by step 303. Each border point at which a primary differential value is changed from positive to negative is detected based on the result obtained by step 304, in step 305. An value of the image data of a pixel corresponding to each border point on the smoothed histogram curve is defined as a border value. Each border pixel having the border value is detected from pixels in one line, in step 306. Step 306 is repeatedly carried out for all lines of the image data stored in the memory, so that border pixels for all lines of the image data are stored in the memory, in step 307. Each of the border pixels is located on a border between image regions corresponding to adjacent anatomical regions.

An image region corresponding to each anatomical region is determined based on the border pixels in all lines of the image stored in the memory.

After this, a spatial frequency processing is applied to the image data stored in the memory, in step 308, in the same manner as that in step 207 shown in FIG. 10. In the spatial frequency processing, the enhancement coefficient used in the spatial frequency processing is varied in accordance with the image regions corresponding to the anatomical regions, as shown in FIG. 8 or FIG. 9.

In the processes shown in FIGS. 10 and 11, after the spatial frequency processing, a predetermined gradational processing is applied to the image data, the image corresponding to the X-ray photograph is displayed in a CRT or printed on a silver film (steps 208, 209, 210 and 211 in FIG. 10, and steps 309, 310, 311 and 312 in FIG. 11).

A description will now be given of a case where a gradational processing is carried out, as the image processing, with reference to FIGS. 12-17.

A gradational curve representing a relationship between values of input and output data is applied to an image region corresponding to each anatomical region. Gradational curves applied to image regions corresponding to the anatomical regions differ from each other so that an output image in which a gradational property is improved is obtained.

Figure 12:
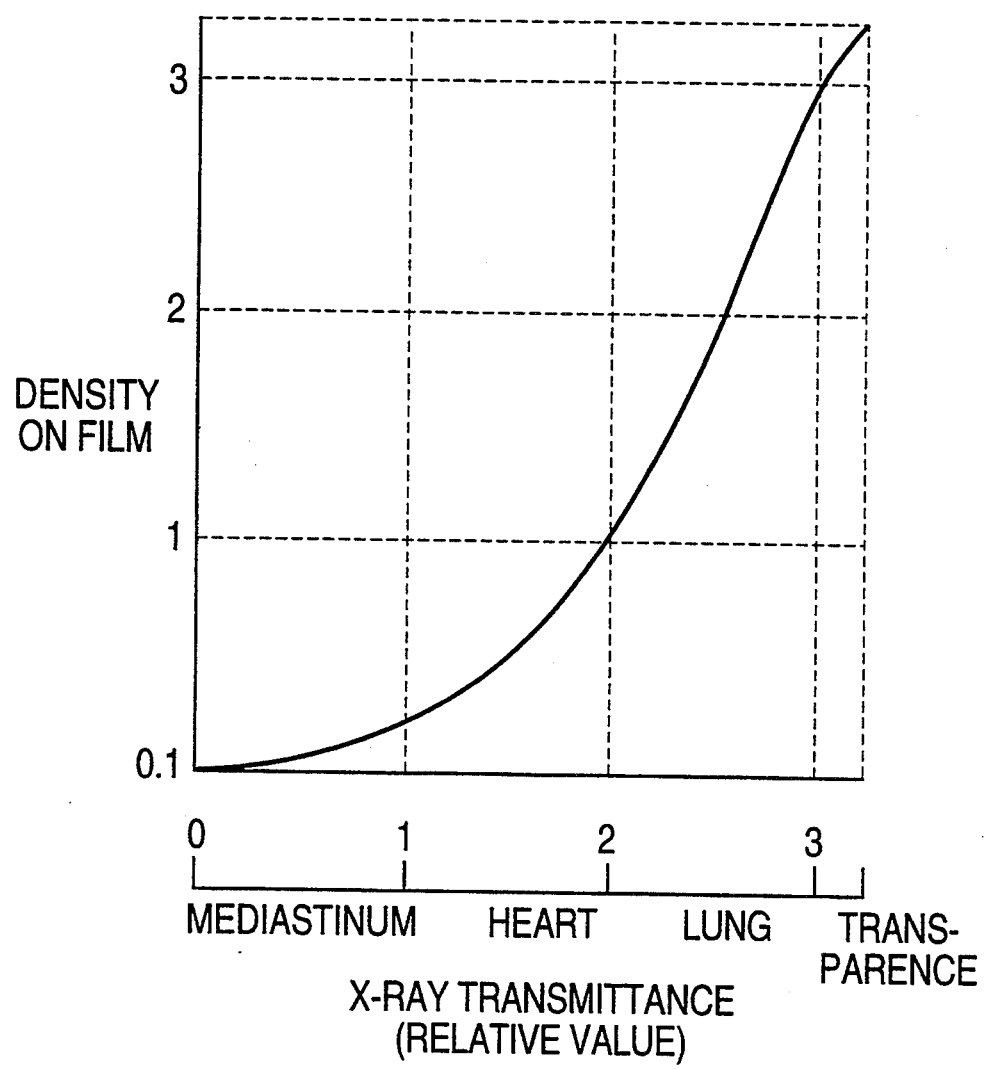
FIG. 12 is a graph illustrating a sensitive curve of and X-ray film.
Figure 13:
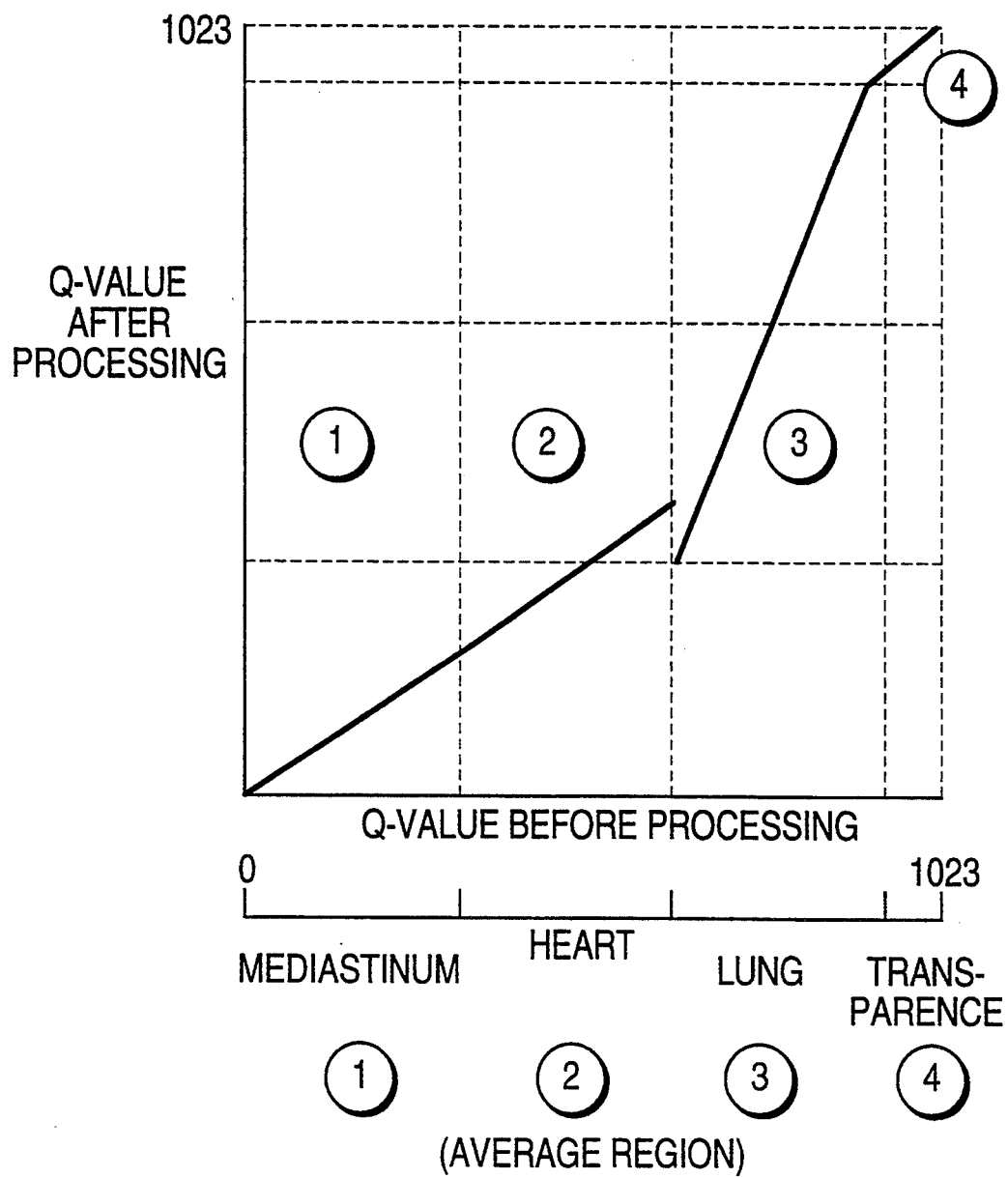
FIGS. 13 and 14 are graphs illustrating a gradational curve in an X-ray photograph.
Figure 14:
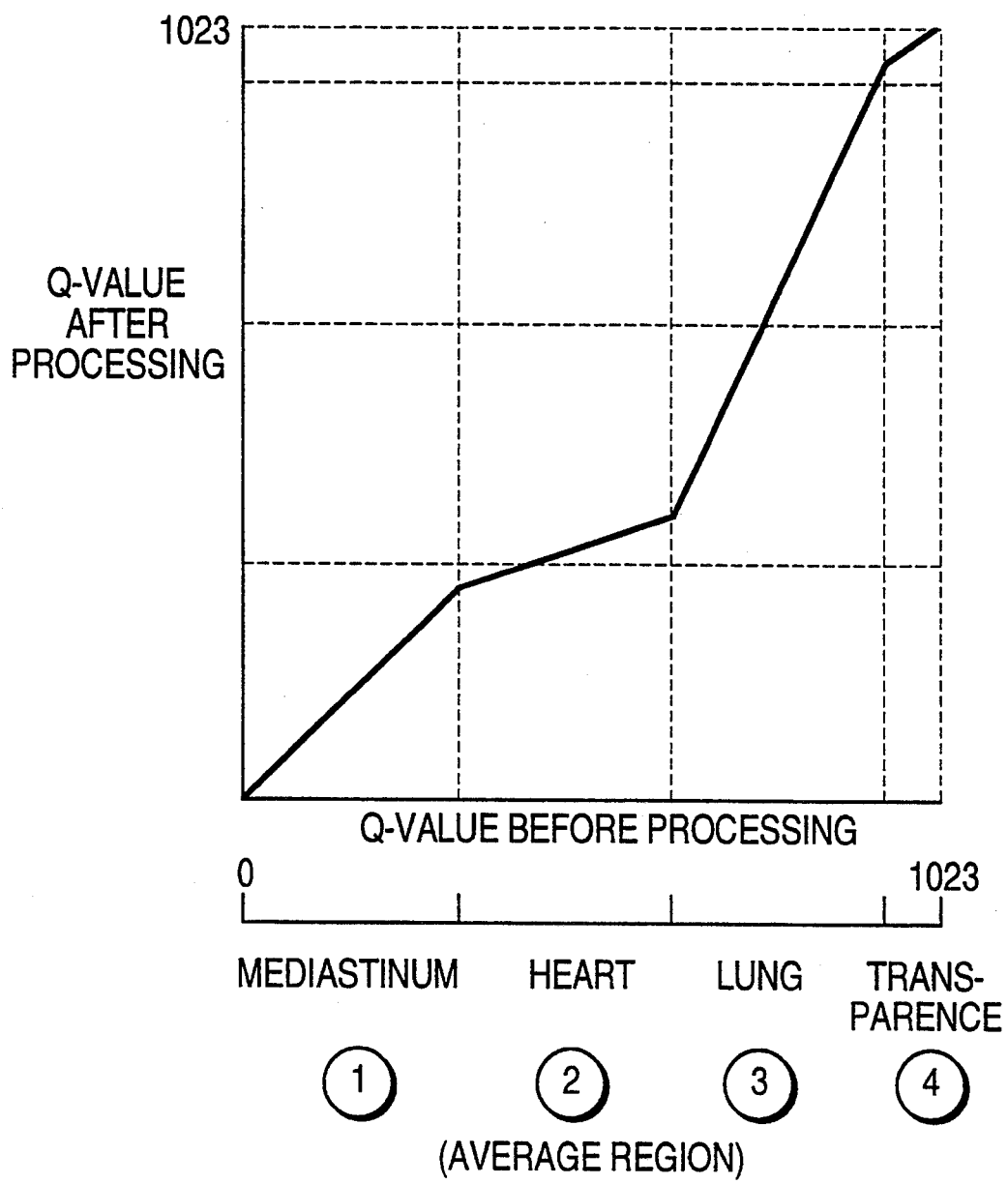

A conventional X-ray film has a sensitivity with respect to transmittance of X-ray shown in FIG. 12. On the other hand, in an embodiment of the present invention, a gradational curve applied to each anatomical region differs from that applied to other anatomical region, as shown in FIGS. 13 and 14. The gradational curves shown in FIG. 13 are not continuous. That is, when the gradational processing is carried out in accordance with the gradational curves shown in FIG. 13, two output values corresponding to one input value can be obtained for each border between image regions corresponding to adjacent anatomical regions. In a case where the difference between two output values corresponding to one input value in the gradational curves is small as shown in FIG. 13, the quality of an image displayed in the CRT or printed on a silver film after the gradational processing does not deteriorate.

In an X-ray photograph obtained by the conventional S/F method, and digital image obtained by using the photostimulable phosphor, a contrast of density in each of images corresponding to the centrum, the diaphragm region and the heart region is poor. Thus, the gradational curves, shown in FIGS. 13 and 14, are made so that a range of density representing each of the images corresponding to the centrum and the diaphragm region is increased in order to improve the contrast of density in each of the images. Further, a level of the density in an image corresponding to the heart region is increased. As the range of density representing each of the images corresponding to the centrum and the diaphragm region is increased, a range of density representing an image corresponding to the lung region is decreased.

According to the gradational processing using the gradational curves shown in FIG. 13 or 14, an image having an improved balance of density can be obtained. That is, the image corresponding to the lung region is fine, and a thoracic vertebrae and vascular tracts are shown in the images corresponding to the heart-diaphragm region and the mediastinum. Thus, a thorax image in which diseases in each anatomical region can be easily found can be obtained.

Figure 15:
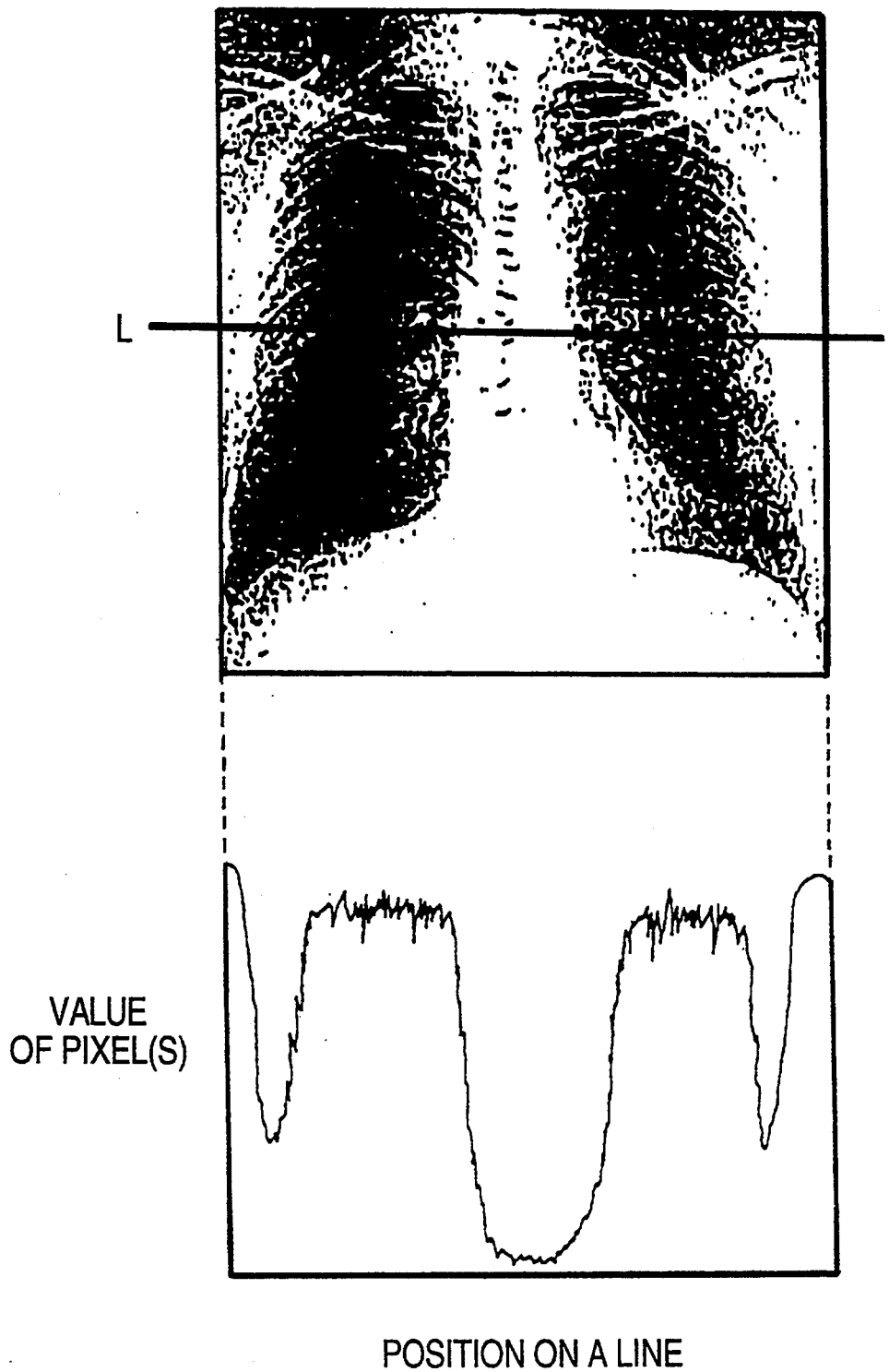
FIG. 15 is a diagram illustrating a thorax X-ray photograph and image data for one line on the thorax X-ray photograph.

In a case of a thorax X-ray photograph, values of image data for one line (L) vary as shown in FIG. 15. Each value of image data corresponds to X-ray transmittance. A pixel in an image region corresponding to an anatomical region having a large X-ray transmittance has a large value of image data. Referring to FIG. 15, a pixel in an image region corresponding to a transparent region which is not an anatomical region has a maximum value of image data. A pixel in an image region corresponding to an anatomical region around the ribs has a small value of image data. A pixel in an image region corresponding to the lung region has a large value of image data. A pixel in an image region corresponding to the mediastinum has a value less than that in the image region corresponding to the lung region. An anatomical region corresponding to an image region to which a pixel belongs can be easily determined based on a value of the image data of the pixel, with reference to a curve representing image data for one line shown in FIG. 15.

Figure 16:
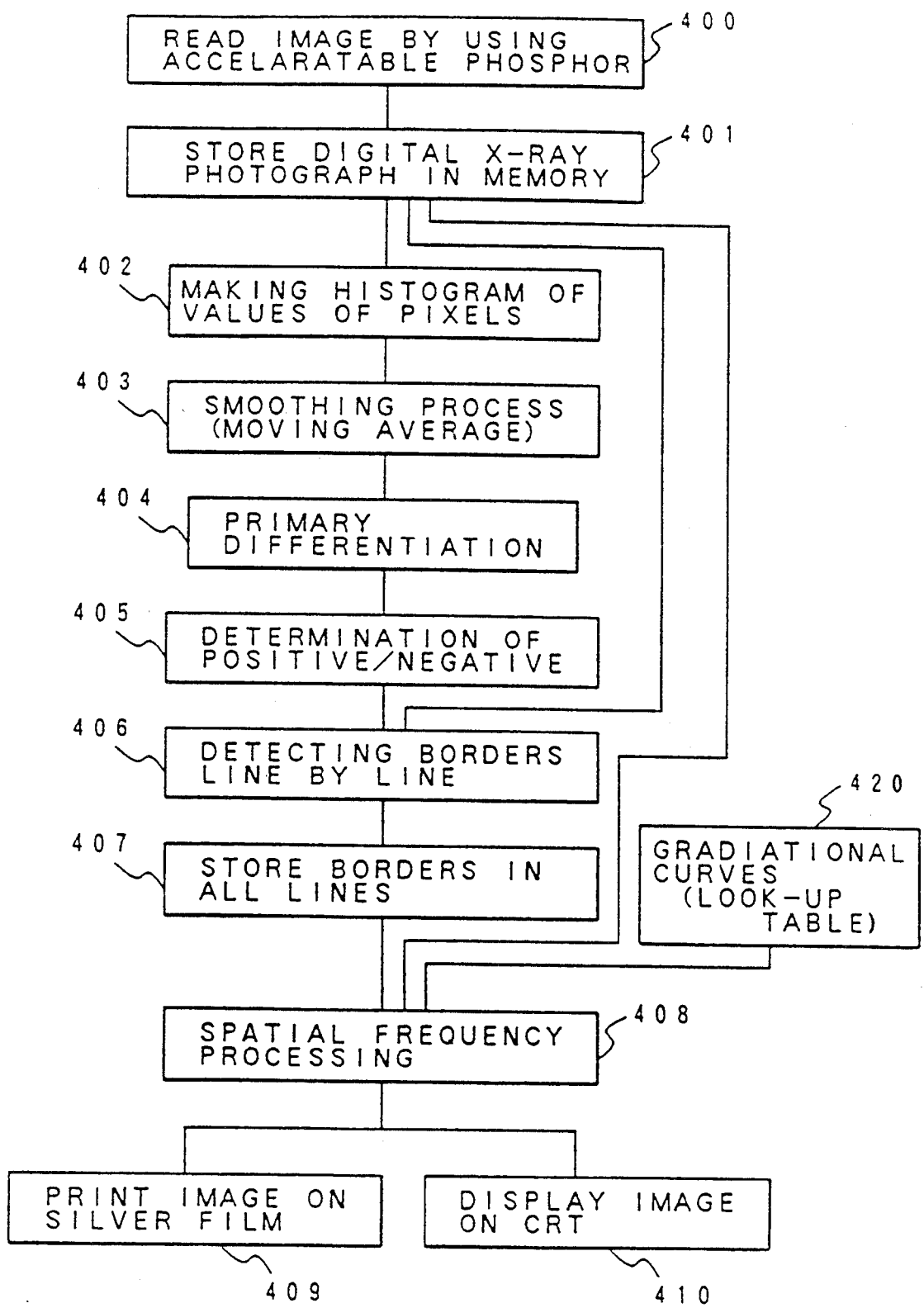
FIGS. 16 and 17 are flow charts illustrating examples of a gradational processing.

FIG. 16 shows a third embodiment of the image processing. Referring to FIG. 16, steps 400 through 407 are carried out in the same manner as steps 300 through 307 shown in FIG. 11, so that an image region corresponding to each anatomical region is determined based on the border pixels in all lines of the image stored in the memory.

After this, a gradational processing is applied to the image data stored in the memory, in step 407. The gradational processing is carried out with reference to a look-up table (420) storing the gradational curves shown in FIG. 13 or 14. That is, a gradational curve used in the gradational processing is varied in accordance with the image regions corresponding to the anatomical regions, as shown in FIG. 13 or FIG. 14.

Figure 17:
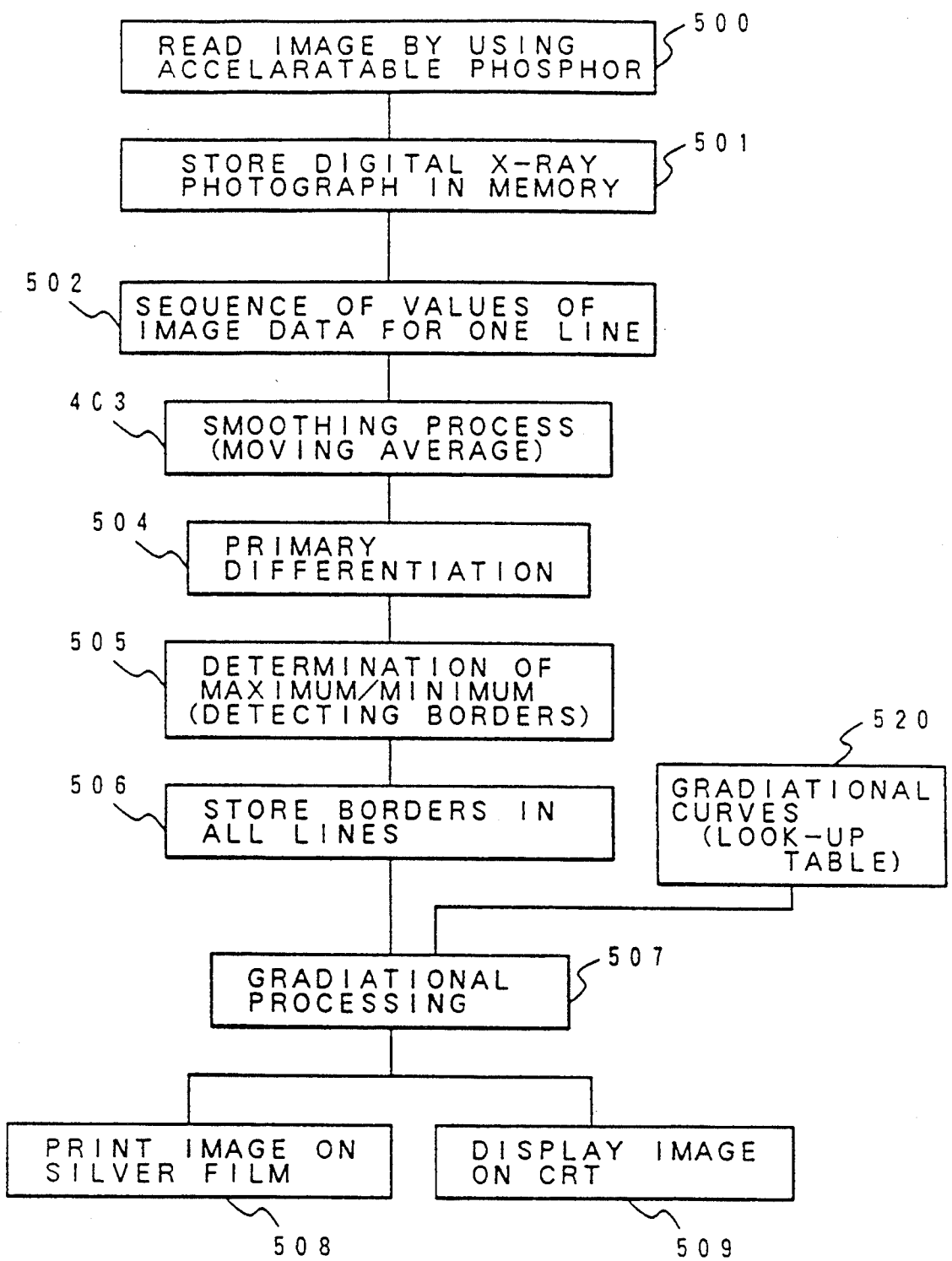

FIG. 17 shows a fourth embodiment of the image processing. Referring to FIG. 17, steps 500 through 506 are carried out in the same manner as steps 200 through 206 shown in FIG. 10, so that an image region corresponding to each anatomical region is determined based on the border pixels in all lines of the image stored in the memory.

After this, a gradational processing is applied to the image data stored in the memory with reference to a look-up table (520) storing the gradational curves shown in FIG. 13 or 14, in step 507. Then the gradational processing is carried out in the same manner as those in step 407 shown in FIG. 16.

In the processes shown in FIGS. 16 and 17, after the gradational processing, the image data obtained in the gradational processing is displayed in a CRT or printed on a silver film (steps 409 and 410 shown in FIG. 16, and steps 508 and 509 shown in FIG. 17).

In a case where the histogram shown in FIG. 6 is made, the image data can be sampled at a ratio of one to 4 or one to 64 pixels.

The present invention is not limited to the aforementioned embodiments, and variations and modifications may be made without departing from the scope of the claimed invention.

What is claimed is:

1. A method for processing an image corresponding to a radiographic pattern, said image being formed of a plurality of pixels each having a value corresponding to density, said method comprising the steps of:
   (a) obtaining the image corresponding to the radiographic pattern so that values of pixels forming said image are stored in a memory;
   (b) dividing the image into a plurality of image regions based on the values of the pixels forming said image, each image region including pixels each of which has a value falling within a predetermined range, and
   said step (b) comprising the steps of:
      (b-1) making a histogram of values of pixels included in said image,
      (b-2) smoothing a curve representing the histogram made by said step (b-1), and
      (b-3) determining said plurality of image regions based on peaks and valleys of a smoothed curve obtained by said step (b-2); and
   (c) applying an image processing to said plurality of image regions of said image, processing conditions used for said plurality of image regions in said image processing differing from each other.

2. A method as claimed in claim 1, wherein said step (b-2) has a step of smoothing the curve in accordance with a moving average method in which an average is calculated for the predetermined range of values of pixels, said predetermined range being moved.

3. A method as claimed in claim 2, wherein said predetermined range is set so that a number of minute variations of said curve representing the histogram included in said predetermined range is equal to or greater than 2.

4. A method as claimed in claim 2, wherein said predetermined range is set so that a number of minute variations of said curve representing said histogram included in said predetermined range is less than 10.

5. A method as claimed in claim 1, wherein said predetermined range is set so as to fall within a range of 1/200–1/20 of a total range of values in said histogram.

6. A method as claimed in claim 1, wherein said step (b-3) has a step of applying a primary differential process to the smoothed curve, so that a point at which the primary differentiation value is equal to zero is detected as either a peak or a valley.

7. A method as claimed in claim 1, wherein said step (b-3) has a step for applying a primary differentiation process to the smoothed curve, so that a point at which a value of primary differentiation changes from positive to negative is determined as a border value between two image regions.

8. A method as claimed in claim 1, wherein said step (a) obtains the image corresponding to a thorax X-ray photograph.

9. A method as claimed in claim 8, wherein said step (b) divides said image into a plurality of image regions each corresponding to an anatomical region in the thorax.

10. A method as claimed in claim 9, wherein said plurality of image regions obtained by step (b) correspond to a first anatomical region including a centrum, a second anatomical region including a heart and a diaphragm, a third anatomical region including a lung and a region including no tissue.

11. A method as claimed in claim 1, wherein said image processing performed in said step (c) includes a spatial frequency process in which values of pixels are enhanced by using a predetermined enhancement coefficient.

12. A method as claimed in claim 1, wherein said image processing performed in said step (c) includes a gradational process in which the value of each pixel is converted into a new value in accordance with a predetermined characteristic curve of gradation.

13. A method as claimed in claim 11, wherein said spatial frequency process is performed in accordance with a first formula, $$Q = S + K \cdot (S - S_m)$$

where S is a value of a central pixel in an unsharp mask which is an $n \times n$ matrix, $S_m$ is an average of values of pixels in the unsharp mask, K is an enhancement coefficient, and Q is a value obtained by the spatial frequency process, said enhancement coefficient K being varied in accordance with the image regions.

14. A method as claimed in claim 11 wherein said spatial frequency process is performed in accordance with a second formula, $$Q = S + f(S - S_m) \cdot (S - S_m)$$

where S is a value of a central pixel in an unsharp mask which is an $n \times n$ matrix, $S_m$ is an average of values of pixels in the unsharp mask, $f(S - S_m)$ is a enhancement coefficient which is a function of $(S - S_m)$ and Q is a value obtained by the spatial frequency process.

15. A method as claimed in claim 11 wherein said spatial frequency process is performed in accordance with a third formula, $$Q = S + (A/\sigma + B) \cdot (S - S_m)$$

where S is a value of a central pixel in an unsharp mask which is an $n \times n$ matrix, $S_m$ is an average of values of pixels in the unsharp mask, $(A/\sigma + B)$ is a coefficient representing the enhancement coefficient, A and B are constants, $\sigma$ is a standard deviation of a value of each pixel in the unsharp mask, and Q is a value obtained by the spatial frequency process, wherein A and B are constants.

16. A method as claimed in claim 13, wherein said enhancement coefficient K varies with respect to values of pixels in accordance with a monotone decreasing curve.

17. A method as claimed in claim 14, wherein said function $f(S-S_m)$ is a monotone decreasing function.

18. A method as claimed in claim 15, wherein said coefficient $(A/\sigma+B)$ varies in accordance with a monotone decreasing curve with respect to values of pixels.

19. A method as claimed in claim 9, wherein said plurality of image regions obtained by step (b) correspond to a first anatomical region including a mediastinum and a centrum, a second anatomical region including a heart and a diaphragm, a third anatomical region including a lung and a region including no tissue, and wherein said image processing performed in said step (c) includes a spatial frequency process in which values of pixels in an unsharp mask are enhanced by using a predetermined enhancement coefficient, a size of the unsharp mask used in an image region corresponding to said first anatomical region being greater than a size of the unsharp mask used in an image region corresponding to said second anatomical region.

20. An apparatus for processing an image corresponding to a radiographic pattern, said image being formed of a plurality of pixels each having a value corresponding to density, said apparatus comprising:

reading means for reading the image corresponding to the radiographic pattern;

memory means, coupled to said reading means, for storing values of pixels forming said image;

dividing means, coupled to said memory means, for dividing the image stored in said memory means into a plurality of image regions based on the values of the pixels forming said image, each image region including pixels each of which has a value falling with a predetermined range, said dividing means comprising:

first means for making a histogram of values of pixels included in said image, second means for smoothing a curve representing the histogram made by said first means, and third means for determining said plurality of image regions based on peaks and valleys of a smoothed curve obtained by said second means; and processing means for applying an image process to said plurality of image regions of said image, processing conditions used for said plurality of image regions in said image processing differing from each other.

21. An apparatus as claimed in claim 20, wherein said reading means has means for reading the image stored in a photostimulable phosphor, said image corresponding to an X-ray photograph.

22. An apparatus as claimed in claim 20, wherein said reading means has means for reading the image on an X-ray photographic film.

23. A method for processing an image corresponding to a radiographic pattern, said image being formed of a plurality of pixels each having a value corresponding to density, said method comprising the steps of:

(a) obtaining the image corresponding to the radiographic pattern so that values of pixels forming said image are stored in a memory, said step (a) obtaining an image corresponding to a thorax X-ray photograph;

(b) dividing the image into a plurality of image regions based on the values of the pixels forming said image, each image region including pixels each of which has a value falling within a predetermined range, said step (b) dividing said image into a plurality of image regions each corresponding to an anatomical region in the thorax, and said step (b) comprising the steps of:

(b-1) making a histogram of values of pixels included in said image, (b-2) smoothing a curve representing the histogram made by said step (b-1), and (b-3) determining said plurality of image regions based on peaks and valleys of a smoothed curve obtained by said step (b-2); and (c) applying an image processing to said plurality of image regions of said image, processing conditions used for said plurality of image regions in said image processing differing from each other.

* * * * *